United States Patent
Majjigi et al.

(10) Patent No.: US 9,853,681 B2
(45) Date of Patent: Dec. 26, 2017

(54) ARBITRATOR FOR MULTI-RADIO ANTENNA SWITCHING

(71) Applicant: Apple Inc., Cupertino, CA (US)

(72) Inventors: Vinay R. Majjigi, Sunnyvale, CA (US); Syed Aon Mujtaba, Santa Clara, CA (US); Xiaowen Wang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 67 days.

(21) Appl. No.: 14/870,119

(22) Filed: Sep. 30, 2015

(65) Prior Publication Data

US 2016/0127006 A1 May 5, 2016

Related U.S. Application Data

(60) Provisional application No. 62/074,583, filed on Nov. 3, 2014.

(51) Int. Cl.
*H04B 1/44* (2006.01)
*H04B 7/06* (2006.01)
(Continued)

(52) U.S. Cl.
CPC ............ *H04B 1/44* (2013.01); *H04B 7/0602* (2013.01); *H04B 7/0802* (2013.01); *H04W 84/12* (2013.01); *H04W 88/06* (2013.01)

(58) Field of Classification Search
USPC ......... 455/78, 140, 277.2, 562.1, 524, 9, 39, 455/101, 130; 370/252, 329, 315
See application file for complete search history.

(56) References Cited

U.S. PATENT DOCUMENTS

| 5,159,707 A | 10/1992 | Mogi et al. |
| 5,369,801 A | 11/1994 | Smith |

(Continued)

FOREIGN PATENT DOCUMENTS

| EP | 1093098 A1 | 4/2001 |
| EP | 1280230 A1 | 1/2003 |

(Continued)

OTHER PUBLICATIONS

Office Action, Japanese Application No. 2014524078, dated Jan. 6, 2015, 5 pages.

(Continued)

*Primary Examiner* — Ganiyu A Hanidu
(74) *Attorney, Agent, or Firm* — Meyertons Hood Kivlin Kowert & Goetzel, P.C.; Jeffrey C. Hood; Brian E. Moore

(57) ABSTRACT

A user equipment device (UE) may be configured to collect first performance information from antennas of a first plurality of antennas. The first plurality of antennas may be coupled to a first radio of the UE that may be configured to perform wireless communications according to a first RAT. The UE may determine, based on at least the first performance information, a highest performing antenna of the first plurality of antennas to use for communications according to the first RAT. Additionally, the UE may determine, also based on at least the first performance information, a first antenna of a second plurality of antennas to use for communications according to a second RAT. The second plurality of antennas may be coupled to a second radio of the UE that may be configured to perform wireless communications according to the second RAT.

20 Claims, 6 Drawing Sheets

(51) Int. Cl.
*H04B 7/08* (2006.01)
*H04W 88/06* (2009.01)
*H04W 84/12* (2009.01)

(56) References Cited

U.S. PATENT DOCUMENTS

| | | | |
|---|---|---|---|
| 5,481,571 | A | 1/1996 | Balachandran et al. |
| 5,768,691 | A | 6/1998 | Matero et al. |
| 6,021,317 | A | 2/2000 | Irvin |
| 6,049,705 | A | 4/2000 | Xue |
| 6,115,367 | A | 9/2000 | Archambaud et al. |
| 6,339,400 | B1 | 1/2002 | Flint et al. |
| 6,560,443 | B1 | 5/2003 | Vaisanen et al. |
| 6,650,872 | B1 | 11/2003 | Karlsson |
| 6,760,362 | B2 | 7/2004 | Patel et al. |
| 6,885,880 | B1 | 4/2005 | Ali |
| 7,155,178 | B2 | 12/2006 | Chang et al. |
| 7,239,889 | B2 | 7/2007 | Saari et al. |
| 7,271,769 | B2 | 9/2007 | Asano et al. |
| 7,302,244 | B2 | 11/2007 | Spencer et al. |
| 7,415,295 | B2 | 8/2008 | Tran |
| 7,676,202 | B2 | 3/2010 | Anton-Becker |
| 7,768,461 | B2 | 8/2010 | Cheng et al. |
| 8,150,454 | B2 | 4/2012 | Sanders |
| 8,781,420 | B2 | 7/2014 | Schlub et al. |
| 8,792,575 | B2 | 7/2014 | Liu et al. |
| 8,872,706 | B2 | 10/2014 | Caballero et al. |
| 8,947,302 | B2 | 2/2015 | Caballero et al. |
| 9,070,969 | B2 | 6/2015 | Mow et al. |
| 9,070,974 | B2 | 6/2015 | Hu et al. |
| 9,083,074 | B2 | 7/2015 | Ayatollahi et al. |
| 2003/0073463 | A1 | 4/2003 | Shapira |
| 2004/0227674 | A1 | 11/2004 | Asano et al. |
| 2004/0257283 | A1 | 12/2004 | Asano et al. |
| 2004/0266374 | A1 | 12/2004 | Saed et al. |
| 2004/0266375 | A1* | 12/2004 | Li .................. H04B 7/0811 455/140 |
| 2005/0053039 | A1 | 3/2005 | Dewan et al. |
| 2005/0064903 | A1 | 3/2005 | Uotsu et al. |
| 2005/0073462 | A1 | 4/2005 | Lin et al. |
| 2005/0135318 | A1 | 6/2005 | Walton et al. |
| 2005/0272384 | A1 | 12/2005 | Kogure |
| 2006/0001582 | A1 | 1/2006 | Hayashi |
| 2006/0109184 | A1 | 5/2006 | Chen et al. |
| 2006/0203709 | A1 | 9/2006 | Laroia et al. |
| 2006/0223476 | A1 | 10/2006 | Song et al. |
| 2007/0071149 | A1 | 3/2007 | Li et al. |
| 2007/0121537 | A1 | 5/2007 | Mullins et al. |
| 2007/0129034 | A1 | 6/2007 | Adams et al. |
| 2007/0218853 | A1 | 9/2007 | Yu |
| 2008/0018541 | A1 | 1/2008 | Pang et al. |
| 2008/0139153 | A1* | 6/2008 | Tuo .................. H04B 17/391 455/277.2 |
| 2008/0227498 | A1* | 9/2008 | Kwon ................ H04B 7/082 455/562.1 |
| 2008/0240260 | A1 | 10/2008 | Heidari et al. |
| 2008/0285530 | A1 | 11/2008 | Dietrich et al. |
| 2008/0316115 | A1 | 12/2008 | Hill et al. |
| 2009/0017767 | A1 | 1/2009 | Mashimo |
| 2009/0180429 | A1 | 7/2009 | Stevens et al. |
| 2009/0284354 | A1* | 11/2009 | Pinkham ............ G06K 7/0008 340/10.3 |
| 2010/0016023 | A1 | 1/2010 | Yamauchi et al. |
| 2010/0183099 | A1 | 7/2010 | Toda et al. |
| 2010/0210235 | A1 | 8/2010 | Ulupinar et al. |
| 2010/0220673 | A1 | 9/2010 | Hui et al. |
| 2010/0297959 | A1 | 11/2010 | Newton et al. |
| 2011/0269498 | A1* | 11/2011 | Li .................... H04B 7/024 455/524 |
| 2012/0057621 | A1 | 3/2012 | Hong et al. |
| 2012/0082257 | A1 | 4/2012 | Kent et al. |
| 2012/0122407 | A1 | 5/2012 | Allpress et al. |
| 2012/0148057 | A1 | 6/2012 | Beerends et al. |
| 2013/0222515 | A1* | 8/2013 | Abuan ................ H04N 7/14 348/14.01 |
| 2013/0237294 | A1 | 9/2013 | Periyalwar et al. |
| 2013/0242772 | A1 | 9/2013 | Attar et al. |
| 2013/0288624 | A1 | 10/2013 | Mujtaba et al. |
| 2013/0308478 | A1* | 11/2013 | He .................. H04B 7/0608 370/252 |
| 2013/0308608 | A1 | 11/2013 | Hu et al. |
| 2014/0162566 | A1 | 6/2014 | Desclos et al. |
| 2015/0282057 | A1 | 10/2015 | Li et al. |

FOREIGN PATENT DOCUMENTS

| | | |
|---|---|---|
| EP | 1995889 A1 | 11/2008 |
| JP | H06053879 A | 2/1994 |
| JP | 2002524965 A | 8/2002 |
| JP | 2009033532 A | 2/2009 |
| WO | 0014905 A1 | 3/2000 |
| WO | 0105088 A1 | 1/2001 |
| WO | 0159945 A1 | 8/2001 |
| WO | 03096474 A1 | 11/2003 |
| WO | 2004047309 A2 | 6/2004 |
| WO | 2004102744 A1 | 11/2004 |
| WO | 2005084379 A2 | 9/2005 |
| WO | 2008055039 A2 | 5/2008 |
| WO | 2010025023 A2 | 3/2010 |
| WO | 2010068016 A2 | 6/2010 |
| WO | 2010088612 A1 | 8/2010 |
| WO | 2011007211 A1 | 1/2011 |
| WO | 2014071586 | 5/2014 |

OTHER PUBLICATIONS

Office Action, Korean Patent Application No. 1020147002894, dated Dec. 8, 2014, 11 pages.

Communication pursuant to Article 94(3) EPC, Application No. 15191807.5, dated Apr. 3, 2017, 8 pages.

Extended European Search Report, Application No. 15191807.5, dated Dec. 11, 2015, 10 pages.

* cited by examiner collect first performance information from each antenna of a first plurality of antennas coupled to a first radio of the UE, where the first radio is configured to perform wireless communication according to a first RAT
710 determine, based on at least the first performance information, a highest performing antenna of the first plurality of antennas to use for communications according to the first RAT
720 determine, based on at least the first performance information, a first antenna of a second plurality of antennas to use for communications according to a second RAT, where the second plurality of antennas are coupled to a second radio of the UE, where the second radio is configured to perform wireless communication according to the second RAT
730

FIG. 7

ARBITRATOR FOR MULTI-RADIO ANTENNA SWITCHING

PRIORITY DATA

This application claims benefit of priority to U.S. Provisional Application Ser. No. 62/074,583, titled "Arbitrator for Multi-Radio Antenna Switching", filed Nov. 3, 2014, by Vinay R. Majjigi, Syed Aon Mujtaba, and Xiaowen Wang, which is hereby incorporated by reference in its entirety as though fully and completely set forth herein.

FIELD

The present application relates to wireless communication, including to antenna selection in a multiple antenna user equipment (UE) device.

DESCRIPTION OF THE RELATED ART

Wireless communication systems are rapidly growing in usage. Additionally, there exist numerous different wireless communication technologies and standards. Some examples of wireless communication standards include GSM, UMTS (WCDMA, TDS-CDMA), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), IEEE 802.16 (WiMAX), Bluetooth, etc.

A wireless handheld device, i.e., a user equipment device (UE or UE device), may include multiple antennas. The multiple antennas may be used to support more reliable or higher performance transmission and reception. In some instances, the UE may include multiple receive chains (and antennas) and a single transmission chain (that can only use one of the multiple antennas at any one time) for a certain radio access technology (RAT). In other instances, the UE may include multiple receive chains and multiple transmission chains, as well as multiple antennas for a RAT. The UE may further have one or more antennas for each of several different RATs operating in the UE, such as cellular, WiFi, Bluetooth, etc.

Different ones of the antennas may provide better transmission or reception capability at different times. For example, a user may alter the performance of one or more of the multiple antennas by gripping the UE in different manners. This may cause performance degradation in antennas used by several different radio access technologies (RATs) used within the UE. This may impact quality of service as well as power consumption of the UE. Therefore, improvements in the field would be desirable.

SUMMARY

Embodiments are presented herein of, inter alia, a user equipment (UE) and improved communication methods which enable a UE to better select an appropriate antenna for communication.

Some embodiments relate to a user equipment device (UE) comprising at least two pluralities of antennas, each plurality associated with a respective radio, and one or more processors coupled to the radios. Each radio is configured to perform wireless communications using at least one radio access technology (RAT). The one or more processors and the radios are configured to perform voice and/or data communications, as well as the methods described herein.

In some embodiments the UE may collect first performance information from antennas of a first plurality of antennas. The first plurality of antennas may be coupled to a first radio that performs wireless communications according to a first RAT. The UE may determine, based on at least the first performance information, a highest performing antenna of the first plurality of antennas to use for communications according to the first RAT. Additionally, the UE may determine, also based on at least the first performance information, a first antenna of a second plurality of antennas to use for communications according to a second RAT. For example, if one of the first antennas is performing poorly, the UE may presume that an antenna of another RAT that is most proximally located to this poorly performing antenna is likely suffering similar performance degradation issues.

Thus the UE may use antenna performance information of one or more antennas of a first RAT to aid in selecting an antenna used for communication according to a second RAT. The UE can thus coordinate its antenna usage across multiple different types of radios, i.e., across multiple different RATs. In some embodiments, the first RAT may be a cellular RAT such as LTE or LTE-A and the second RAT may be a short range wireless communications RAT such as Wi-Fi or Bluetooth. In some embodiments, the first RAT may be a short range wireless communications RAT such as Wi-Fi or Bluetooth and the second RAT may be a cellular RAT such as LTE or LTE-A.

In some embodiments, a processing element may be configured to receive first performance information from a first baseband processor configured to operate according to a RAT, determine, receive second performance information from a second baseband processor configured to operate according to a second RAT, and determine, based on at least the first and second performance information, a highest performing antenna from the first and second plurality of antennas. Additionally, in response to determining that the highest performing antenna is among the first plurality of antennas, the processing element may be configured to select the highest performing antenna for communication according to the first RAT and select an antenna among the second plurality of antennas proximal the highest performing antenna for communication according to the second RAT. The first performance information may comprise performance information from antennas of a first plurality of antennas and the second performance information may comprise performance information from antennas of a second plurality of antennas.

In some embodiments, a processing element may be configured to receive, from a first radio of a UE, first performance information from antennas of a first plurality of antennas coupled to the first radio, the first radio being configured to perform wireless communication according to a RAT. Additionally, the processing element may be configured to notify the first radio of a highest performing antenna of the first plurality of antennas to use for communications according to the first RAT, the highest performing antennas is determined based at least in part on the first performance information. Further, the processing element may be configured to notify a second radio of the UE of a first antenna of a second plurality of antennas to use for communications according to a second RAT, the second plurality of antennas being coupled to the second radio of the UE and the second radio being configured to perform wireless communication according to the second RAT. The first antenna may be determined based at least in part on the first performance information.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

FIG. 7 illustrates a block diagram of an example method for a UE to select an antenna for communications according to a first RAT based on performance information of another antenna communicating according to a second RAT, according to some embodiments.

Figure 1:
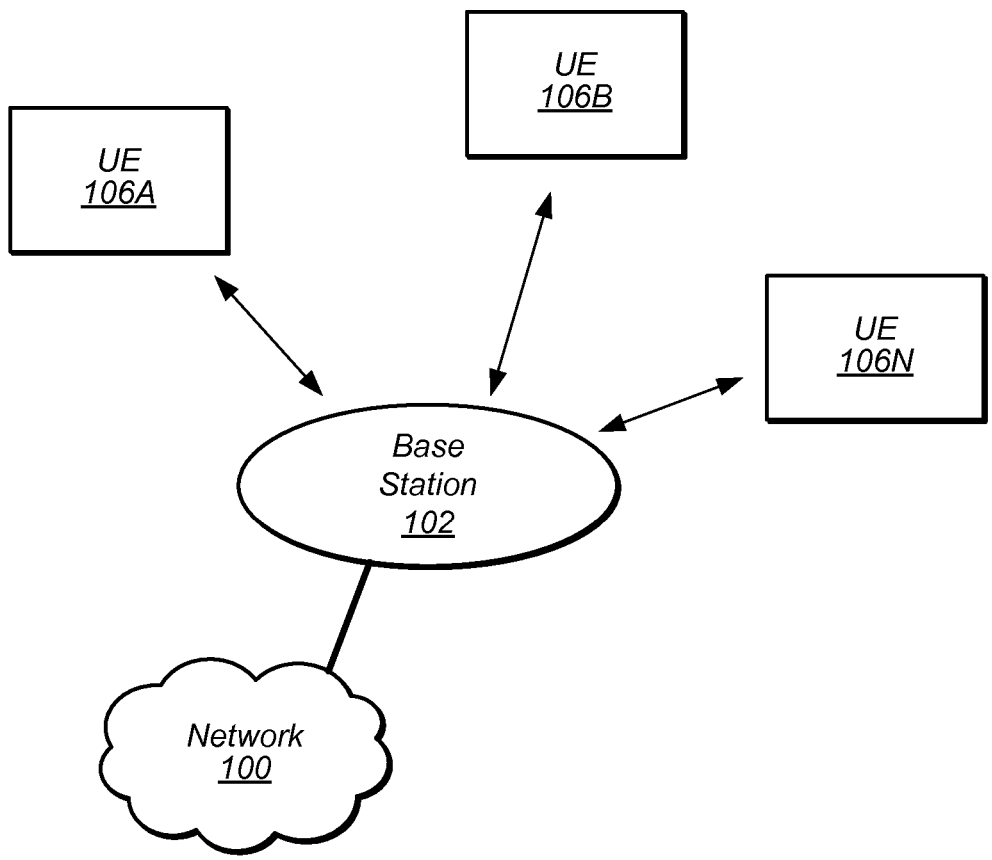
FIG. 1 illustrates an exemplary wireless communication system.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present application. Definitions of the most prominently used acronyms that may appear throughout the present application are provided below:

UE: User Equipment
BS: Base Station
DL: Downlink (from BS to UE)
UL: Uplink (from UE to BS)
FDD: Frequency Division Duplexing
TDD: Time Division Duplexing
GSM: Global System for Mobile Communication
LTE: Long Term Evolution
TX: Transmission
RX: Reception
UMTS: Universal Mobile Telecommunication System
LAN: Local Area Network
WLAN: Wireless LAN
RAT: Radio Access Technology Terminology The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" may be broadly defined to encompass any electronic, computing, and/or telecommunications device (or combination of devices) which is easily transported by a user and capable of wireless communication.

Base Station—The term "Base Station" (also called "eNB") has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 MHz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. §112(f) interpretation for that component.

FIG. 1—Wireless Communication System

FIG. 1 illustrates a wireless cellular communication system, according to some embodiments. It is noted that FIG. 1 represents one possibility among many, and that features of the present disclosure may be implemented in any of various systems, as desired.

As shown, the exemplary wireless communication system includes a base station 102A which communicates over a transmission medium with one or more wireless devices 106A, 106B, etc., through 106N. Wireless devices may be user devices, which may be referred to herein as "user equipment" (UE) or UE devices.

The base station 102 may be a base transceiver station (BTS) or cell site, and may include hardware that enables wireless communication with the UE devices 106A through 106N. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the UE devices 106 and/or between the UE devices 106 and the network 100.

The communication area (or coverage area) of the base station 102 may be referred to as a "cell." The base station 102 and the UEs 106 may be configured to communicate over the transmission medium using any of various radio access technologies (RATs) or wireless communication technologies, such as GSM, UMTS (WCDMA, TDS-CDMA), LTE, LTE-Advanced (LTE-A), HSPA, 3GPP2 CDMA2000 (e.g., 1×RTT, 1×EV-DO, HRPD, eHRPD), Wi-Fi, WiMAX etc.

Base station 102 and other similar base stations (not shown) operating according to one or more cellular communication technologies may thus be provided as a network of cells, which may provide continuous or nearly continuous overlapping service to UE devices 106A-N and similar devices over a wide geographic area via one or more cellular communication technologies.

Thus, while base station 102 may presently represent a "serving cell" for wireless devices 106A-N as illustrated in FIG. 1, each UE device 106 may also be capable of receiving signals from one or more other cells (e.g., cells provided by other base stations), which may be referred to as "neighboring cells". Such cells may also be capable of facilitating communication between user devices and/or between user devices and the network 100.

Note that at least in some instances a UE device 106 may be capable of communicating using multiple wireless communication technologies. For example, a UE device 106 might be configured to communicate using two or more of GSM, UMTS, CDMA2000, WiMAX, LTE, LTE-A, Wi-Fi, WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication technologies (including more than two wireless communication technologies) are also possible. Likewise, in some instances a UE device 106 may be configured to communicate using only a single wireless communication technology.

Figure 2:
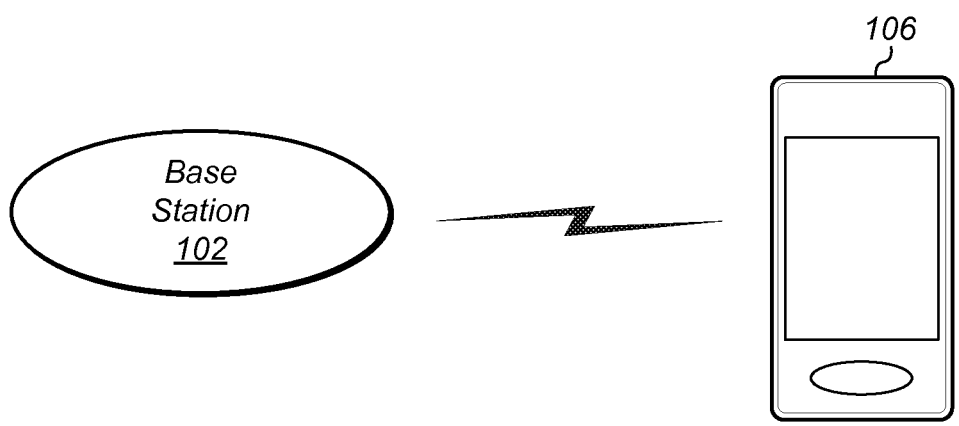
FIG. 2 illustrates an example base station ("BS", or in the context of LTE, an "eNodeB" or "eNB") in communication with a wireless device.

FIG. 2 illustrates UE device 106 (e.g., one of the devices 106A through 106N) in communication with base station 102. The UE device 106 may have cellular communication capability, and as described above, may be a device such as a mobile phone, a hand-held device, a media player, a computer, a laptop or a tablet, or virtually any type of wireless device.

The UE device 106 may include a processor (or processors) that is (are) configured to execute program instructions stored in memory. The UE device 106 may perform any of the method embodiments described herein by executing such stored instructions. Alternatively, or in addition, the UE device 106 may include a programmable hardware element such as an FPGA (field-programmable gate array), or other circuitry, that is configured to perform any of the method embodiments described herein, or any portion of any of the method embodiments described herein.

In some embodiments, the UE device 106 may be configured to communicate using any of multiple radio access technologies and/or wireless communication protocols. For example, the UE device 106 may be configured to communicate using one or more of GSM, UMTS, CDMA2000, LTE, LTE-A, WLAN, Wi-Fi, WiMAX or GNSS. Other combinations of wireless communication technologies are also possible.

The UE device 106 may include one or more antennas for communicating using one or more wireless communication protocols or technologies. In some embodiments, the UE device 106 might be configured to communicate using a single shared radio. The shared radio may couple to a single antenna, or may couple to multiple antennas (e.g., for MIMO) for performing wireless communications. Alternatively, the UE device 106 may include two or more radios. For example, the UE 106 might include a shared radio for communicating using either of LTE or 1×RTT (or LTE or GSM), and separate radios for communicating using each of Wi-Fi and Bluetooth. Other configurations are also possible.

Figure 3:
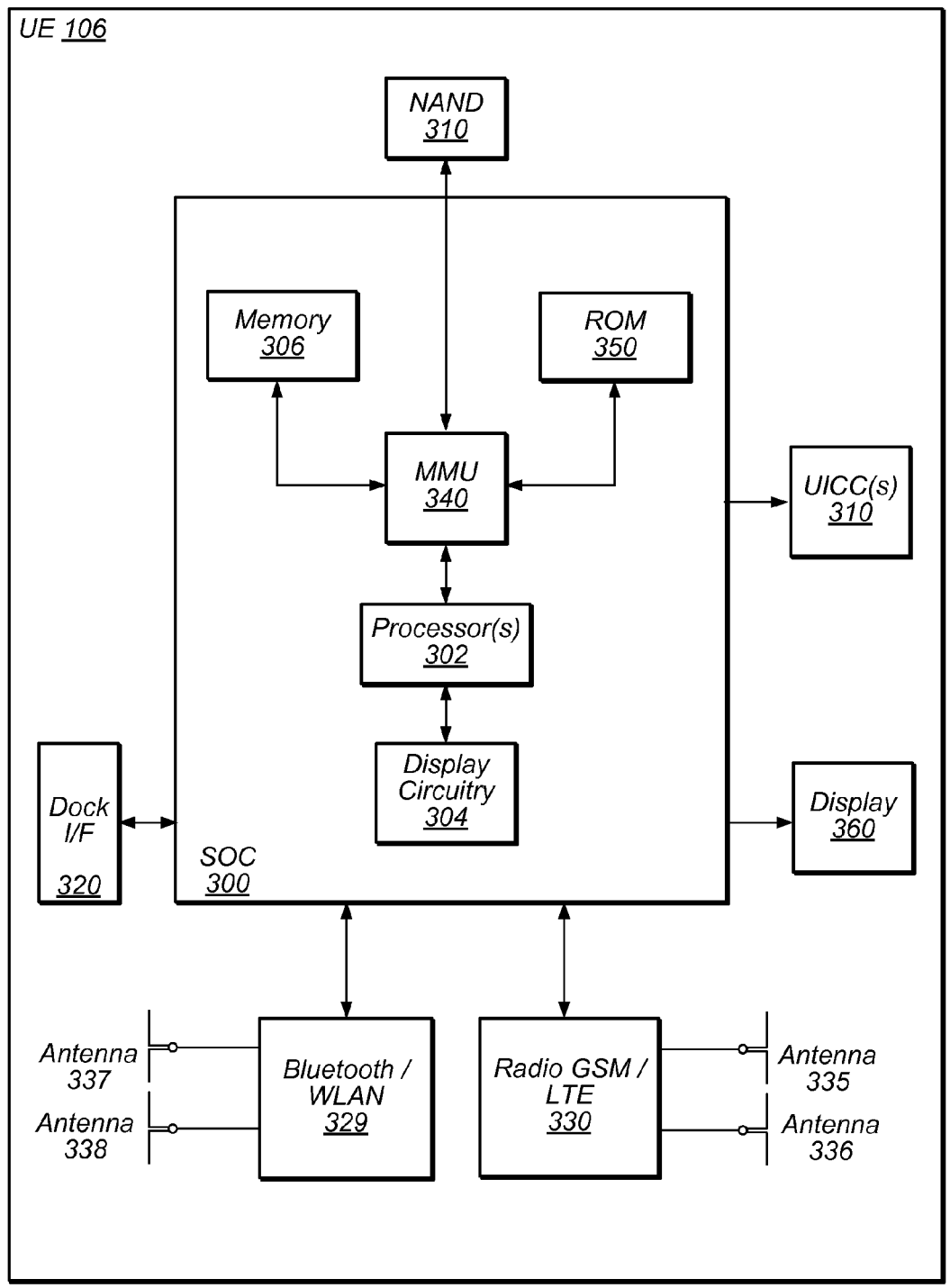
FIG. 3 illustrates a block diagram for one possible implementation of a wireless communication system.

FIG. 3—Example Block Diagram of a UE

FIG. 3 illustrates an example simplified block diagram of a UE 106. As shown, the UE 106 may include a system on chip (SOC) 300, which may include portions for various purposes. The SOC may be coupled to various other circuits of the UE. For example, the UE 106 may include various types of memory (e.g., including NAND flash 310), a connector interface 320 (e.g., for coupling to a computer system, dock, charging station, etc.), the display 360, cellular communication circuitry such as radio GSM/LTE 330 and short range wireless communication circuitry such as Bluetooth/WLAN radio 329 (e.g., for communications according to Bluetooth™ and/or WLAN or Wi-Fi). The UE 106 may further comprise one or more smart cards 310 that comprise SIM (Subscriber Identity Module) functionality, such as one or more UICC(s) (Universal Integrated Circuit Card(s)) cards 310. The radio GSM/LTE 330 may couple to one or more antennas, such as antennas 335 and 336 as shown. The Bluetooth WLAN radio 329 may also couple to one or more antennas, such as antennas 337 and 338 as shown. Alternatively, the Bluetooth/WLAN radio 329 may couple to the antennas 335 and 336 in addition to, or instead of, coupling to the antennas 337 and 338. The Bluetooth/WLAN radio 329 may comprise multiple receive chains and/or multiple transmit chains for receiving and/or transmitting multiple spatial streams, such as in a multiple-input multiple output (MIMO) configuration. Similarly, the radio GSM/LTE 330 may also comprise multiple receive chains and/or multiple transmit chains for receiving and/or transmitting multiple spatial streams, such as in a MIMO configuration.

As shown, the SOC 300 may include processor(s) 302 which may execute program instructions for the UE 106 and display circuitry 304 which may perform graphics processing and provide display signals to the display 340. The processor(s) 302 (e.g., application processor(s), or "AP(s)") may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio GSM/LTE 330, Bluetooth/WLAN radio 329, connector interface (I/F) 320, and/or display 360. The MMU 340 may be configured to perform memory protection and page table translation or set up. In some embodiments, the MMU 340 may be included as a portion of the processor(s) 302.

As noted above, the UE may be configured to communicate wirelessly using one or more radio access technologies (RATs). Thus, the UE 106 may be configured to communicate according to a Wi-Fi RAT for communication in a Wi-Fi network and may also be configured to communicate on other RATs, such as cellular RATs (e.g., LTE), as desired.

As described herein, the UE 106 may include hardware and software components for implementing the features described herein. For example, the processor(s) 302 of the UE device 106 may be configured to implement part or all of the features and methods described herein, e.g., by executing program instructions stored on a memory medium (e.g., a non-transitory computer-readable memory medium). Alternatively (or in addition) the processor(s) 302 may be configured as a programmable hardware element, such as an FPGA (Field Programmable Gate Array), or as an ASIC (Application Specific Integrated Circuit). Additionally (or alternatively) the processor(s) 302 of the UE device 106, in conjunction with one or more of the other components 300, 304, 306, 310, 320, 330, 335, 340, 350, 360 may be configured to implement part or all of the features and methods described herein.

In addition, as described herein, processor 302 may be comprised of one or more processing elements. In other words, one or more processing elements may be included in processor 302. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor 302.

Further, as described herein, Bluetooth/WLAN radio 329 and/or GSM/LTE radio 330 may each be comprised of one or more processing elements. In other words, one or more processing elements may be included in Bluetooth/WLAN radio 329 and/or GSM/LTE radio 330. Thus, Bluetooth/WLAN radio 329 and/or GSM/LTE radio 330 may each include one or more integrated circuits (ICs) that are configured to perform the functions of Bluetooth/WLAN radio 329 and/or GSM/LTE radio 330. In addition, each integrated circuit may include circuitry (e.g., first circuitry, second circuitry, etc.) configured to perform the functions of Bluetooth/WLAN radio 329 and/or GSM/LTE radio 330.

As used herein, the term "UE" may refer to a device such as the UE device 106 as described above.

Figure 4:
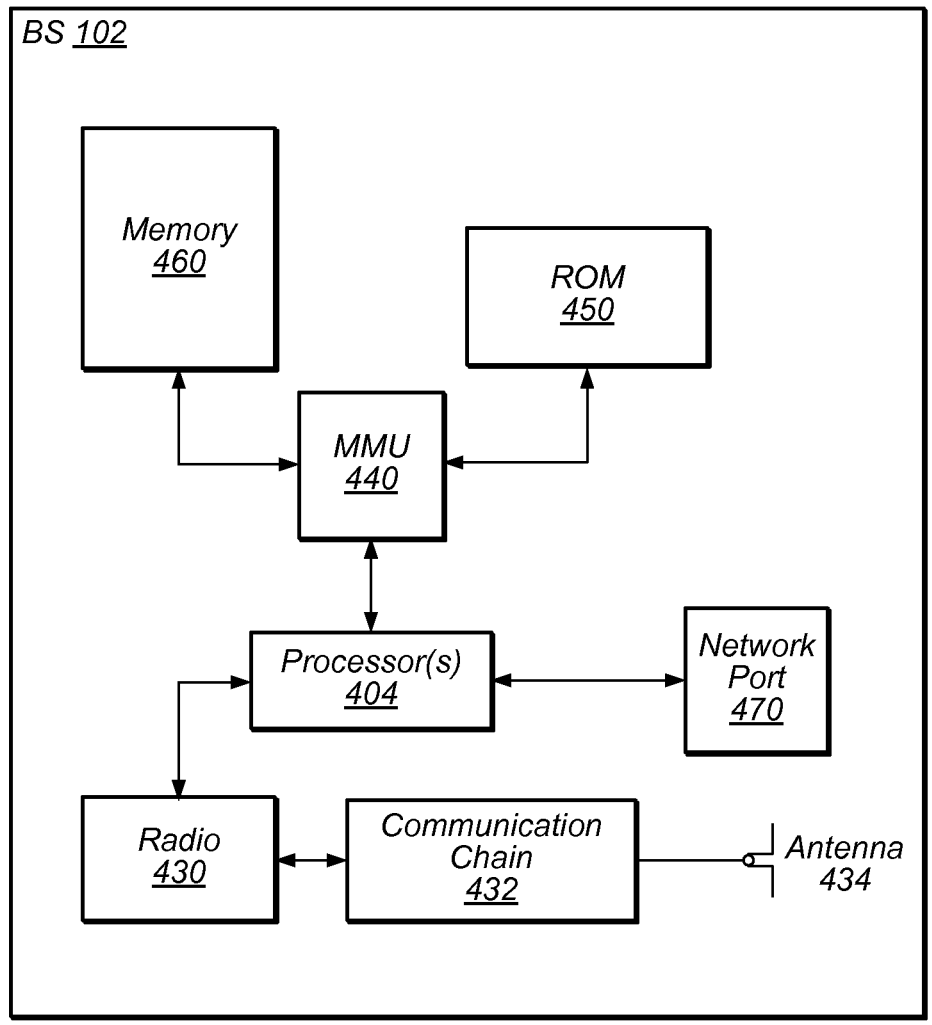
FIG. 4 illustrates a block diagram of an example base station.

FIG. 4—Base Station

FIG. 4 illustrates a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include a radio 430, a communication chain 432 and at least one antenna 434. The base station may be configured to operate as a wireless transceiver and may be further configured to communicate with UE devices 106 via radio 430, communication chain 432 and the at least one antenna 434. Communication chain 432 may be a receive chain, a transmit chain or both. The radio 430 may be configured to communicate via various RATs, including, but not limited to, GSM, UMTS, LTE, WCDMA, CDMA2000, WiMAX, etc.

The processor(s) 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Antenna Selection

Different ones of the antennas may provide better transmission or reception capability at different times. For example, a user may alter the performance of one or more of the multiple antennas by gripping the UE in different manners and/or at different locations. In one example scenario, suppose the UE includes two antennas (A and B), two cellular receive chains, and a single cellular transmission chain. At some times, antenna B may have better performance than antenna A. However, the UE may currently be using antenna A and may be unaware of the performance difference between antenna A and B.

Further, the UE may have a transmission chain for short range wireless communications (e.g., WLAN or Wi-Fi) coupled to additional antennas C and D. In some instances, when the performance of antenna A is impacted by user grip, the antenna associated with other communication methods (e.g., short range wireless communications) that is most proximally located to antenna A may be similarly impacted. For example, the UE may be configured such that antenna A is proximal to antenna C and antenna B is proximal to antenna D. Thus, if antenna A experiences a degradation in performance (e.g., due to a user gripping the UE at the location of antenna A), it may be possible or even likely that antenna C experiences a similar degradation in performance due to antenna C's proximal location to antenna A. In existing systems, the UE cannot take advantage of this information to enable improved antenna selection.

Thus, in some instances, the UE may have performance information for one type of communication (e.g., the UE may collect performance information for a radio in current use, such as a cellular radio) but may lack performance information for another type of communication (e.g., the UE may not have current information for a Wi-Fi radio due to inactivity). Continuing the above example, the UE may have performance information regarding antennas A and B, but may not have similar information regarding antennas C and D.

Embodiments described herein operate to use antenna performance information for one type of communication method or radio access technology (RAT) to help determine the performance information of another type of communication method or RAT. Embodiments described herein thus operation to coordinate antenna usage within a communication type and across communication types.

Figure 5:
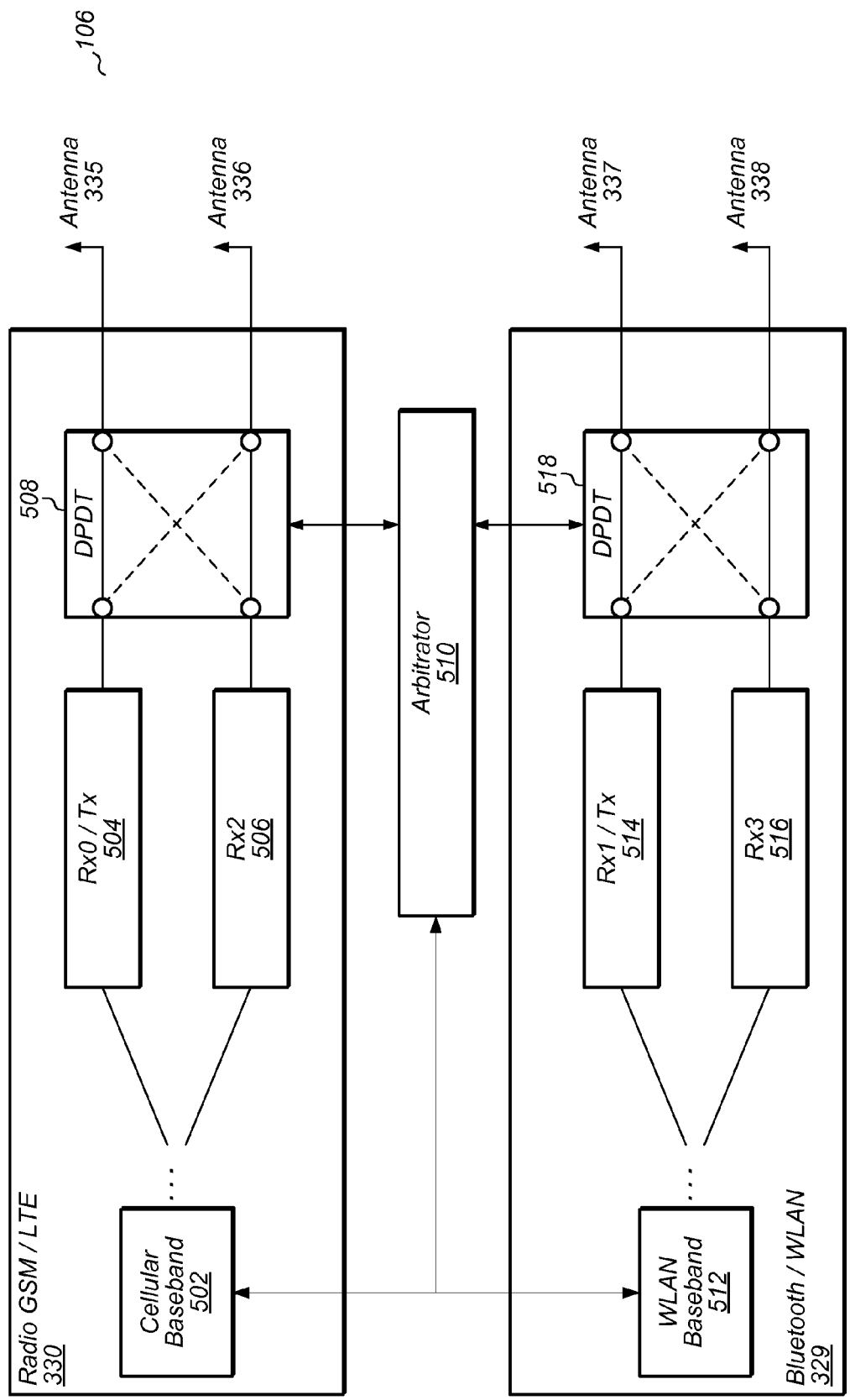
FIGS. 5 and 6 illustrate block diagrams of example user equipment devices.
Figure 6:
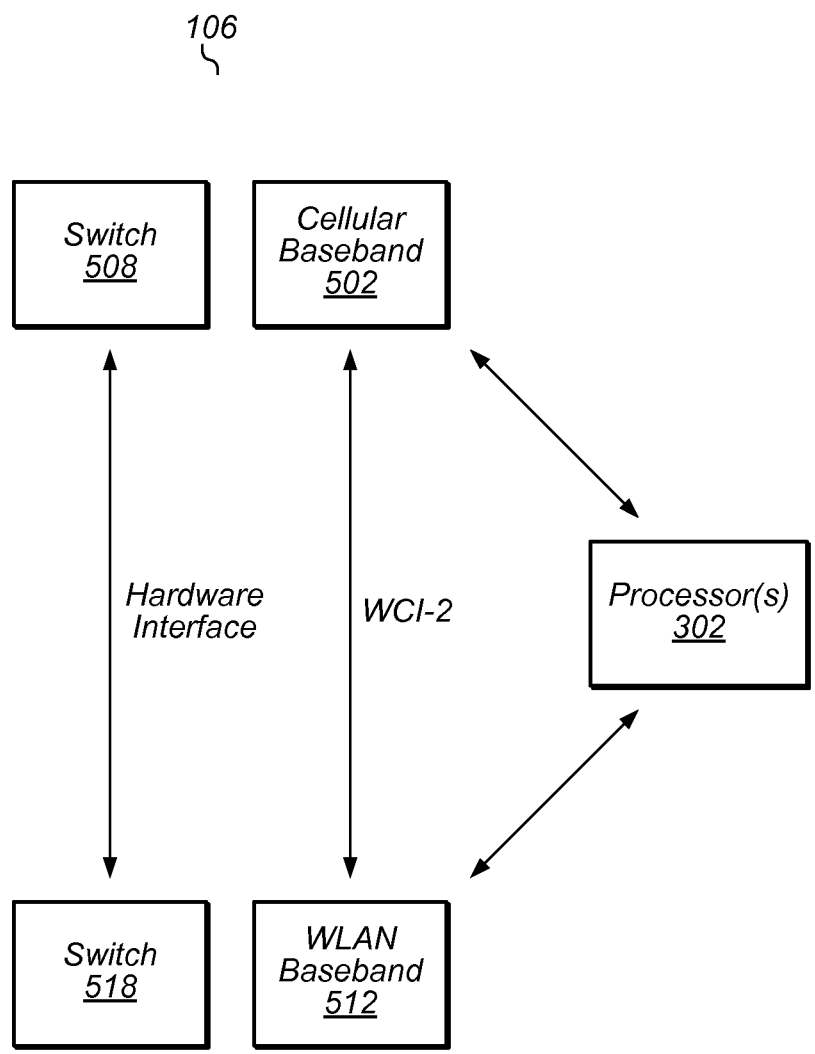

FIGS. 5-6—Exemplary UEs

FIGS. 5 and 6 illustrate exemplary block diagrams of portions of UE 106 according to embodiments. As described with reference to FIG. 3, UE 106 may have multiple antennas and multiple receive/transmit chains. The UE may include multiple radios (Bluetooth/WLAN 329 and Radio GSM/LTE 330), and each radio may include one or more baseband processors (or radio processors). Each baseband processor may be coupled to a plurality of antennas via one or more transmit/receive chains. Further, the transmit/receive chains may be coupled to the plurality of antennas via a switch or switch matrix.

Thus, as shown in FIG. 5, the radio GSM/LTE 330 may include a cellular baseband processor(s) 502. In some embodiments, cellular baseband processor(s) 502 may be comprised of one or more processing elements. In other words, one or more processing elements may be included in cellular baseband processor(s) 502. Thus, cellular baseband processor(s) 502 may include one or more integrated circuits (ICs) that are configured to perform the functions of cellular baseband processor(s) 502. In addition, each integrated circuit may include circuitry (e.g., first circuitry, second circuitry, etc.) configured to perform the functions of cellular baseband processor(s) 502.

The cellular baseband processor(s) 502 may be configured to communicate according to various cellular RATs such as GSM, LTE or LTE-A, among other cellular RATs. The cellular baseband processor(s) 502 may be coupled to antennas 335 and 336 via transmit/receive chains Rx0/Tx 504 and Rx2 506. As illustrated, Rx0/Tx 504 may be coupled to a first input/output of a switch 508. Similarly, Rx2 506 may be coupled to a second input/output of switch 508. Additionally, antennas 335 and 336 may be respectively coupled to a third input/output and a fourth input/output of switch 508.

Note that, although switch 508 is shown included in radio GSM/LTE 330, it is envisioned that switch 508 may be external to radio GSM/LTE 330. In other words, in some implementations, the switch coupling a radio to an antenna (or antennas) can be separate and distinct from the radio. Further, in some implementations, the transmit chain(s) and/or receive chain(s) can be separate and distinct from the radio.

In some embodiments, switch 508 may be a double pole double throw (DPDT) switch and may have a plurality of switch states. For example, in one state, antenna 335 may couple to Rx0/Tx 504 and antenna 336 may couple to Rx2 506. Thus, the UE may transmit via antenna 335 and receive via antennas 335 and 336. In another state, antenna 335 may be coupled to Rx2 506 and antenna 336 may be coupled to Rx0/Tx 504. Hence, the UE may transmit on either antenna 335 or antenna 336 depending upon the state of switch 508.

Similarly, WLAN baseband processor(s) 512 may be coupled to antennas 337 and 338 via transmit/receive chains Rx1/Tx 514 and Rx3 516. In some embodiments, WLAN baseband processor(s) 512 may be comprised of one or more processing elements. In other words, one or more processing elements may be included in WLAN baseband processor(s) 512. Thus, WLAN baseband processor(s) 512 may include one or more integrated circuits (ICs) that are configured to perform the functions of WLAN baseband processor(s) 512. In addition, each integrated circuit may include circuitry (e.g., first circuitry, second circuitry, etc.) configured to perform the functions of WLAN baseband processor(s) 512.

The WLAN baseband processor(s) 512 may be configured to communicate according to a short range wireless RAT such as Wi-Fi and/or Bluetooth, among other short range wireless RATs. As illustrated, Rx1/Tx 514 may couple to a first input/output of a switch 518. Similarly, Rx2 may couple to a second input/output of switch 518. Additionally, antennas 337 and 338 may be respectively coupled to a third input/output and a fourth input/output of switch 518.

Although switch 518 is shown included in Bluetooth/WLAN 329, it is envisioned that switch 518 may be external to Bluetooth/WLAN 329. Further, the transmit chain(s) and/or receive chain(s) may be separate and distinct from the radio.

The UE may also include an arbitrator 510. Arbitrator 510 may be a software entity and/or a hardware entity. It may be included in SOC 300 described above. Alternatively, or in addition, arbitrator 510 may be an entity, or application, executed by processor(s) 302. Thus, as noted above, processor(s) 302 may be an application processor(s) (AP(s)) and arbitrator 510, or a portion of arbitrator 510, may be an application executable by an AP. As shown, arbitrator 510 may be coupled to, or in communication with, switches 508 and 518. Similarly, arbitrator 510 may be coupled to, or in communication with, baseband processors 502 and 512.

In some embodiments, the arbitrator 510 may coordinate the position of switches 508 and 518. Thus, for example, if the arbitrator determines that switch 508 has changed states, the arbitrator may determine to change the state of switch 518 as well. Similarly, if the arbitrator determines that switch 518 has changed states, the arbitrator may determine to change the state of switch 508.

In some embodiments, the arbitrator may coordinate between the baseband processors 502 and 512. For example, the arbitrator may collect performance information (e.g., received signal strength, received signal to noise ratio (SNR), packet error rates, antenna gain, and so forth, including any meaningful combination of performance indicators) from both baseband processors, including, performance information for each antenna coupled to each baseband processor. Thus, if the arbitrator determines that the cellular radio, i.e., cellular baseband processor(s) 502, was the most recently used radio, the arbitrator may use the performance information from the cellular radio to determine the switch state of switch 518 (i.e., which antenna to communicate with) when the UE resumes use of the WLAN radio, i.e., WLAN baseband processor(s) 512. In other words, the next time the WLAN radio is used, whether the WLAN radio is active or idle, the UE may use the determined antenna. Similarly, if the arbitrator determines that the WLAN radio was the most recently used radio, the arbitrator may use the performance information from the cellular radio to determine the switch state of switch 508 (i.e., which antenna to communicate with) when the UE resumes use of the cellular radio. In other words, the next time the cellular radio is used, whether the cellular radio is active or idle, the UE may use the determined antenna.

As another example, the WLAN radio may have significantly more traffic than the cellular radio (even if the cellular radio was most recently used), and the arbitrator may determine that the quantity of performance information available from the WLAN radio may give a better indication of antenna performance. Thus, the arbitrator may use the performance information from the WLAN radio to determine the switch state (i.e., which antenna to communicate with) of the cellular switch (e.g., switch 508). Note that when the cellular radio may have significantly more traffic than the WLAN radio, the arbitrator may use the cellular performance information to determine the state of switch 518.

In a similar example, the cellular radio may be active and the WLAN radio may be idle. Thus, the arbitrator may use cellular metrics to determine which state of switch 518 to use (i.e., which antenna to communicate with) when use of the WLAN radio resumes.

Note that the algorithm (or logic) used may differ depending on type of RAT. Thus, the algorithm used when decisions are based on Wi-Fi metrics may be different than the algorithm used when decisions are based on cellular metrics since the frequency bands and duplex method (frequency division duplexing (FDD) versus time division duplexing (TDD)) may differ.

FIG. 6 illustrates a UE, according to some embodiments. As shown, arbitrator 510 ("arbitrator") may be a combination of a software and hardware entity. In other words, the functionality of the arbitrator may be implemented in both software and hardware. For example, the hardware portion of the arbitrator may be included on SOC 300 while the software portion of the arbitrator may be executed on AP 302. AP 302 may communicate with, or be coupled to both cellular baseband processor(s) 502 and WLAN baseband processor(s) 512. Additionally, as part of the functionality of the arbitrator, cellular baseband processor(s) 502 may be coupled to (in communication with) WLAN baseband processor(s) 512. In some embodiments, a Wireless Coexistence Interface (WCI-2) coupling may couple processors 502 and 512. In some embodiments, the baseband processors may be in direct communication with one another. Additionally, switches 508 and 518 may be coupled via a hardware interface as part of the functionality of the arbitrator (e.g., to create a master/slave action between the switches).

In some embodiments, as shown, the baseband processors may communicate with one another via processor(s) 302 (e.g., application or host processor(s) such as an inter radio access technology manager). In such embodiments, system performance information, such as battery level, battery charging state, and so forth may be available to the arbitrator. Thus, the arbitrator may take into account environmental factors (e.g., signal quality), power factors (UE is currently power limited), or both (UE is power limited due to environmental factors, e.g., transmission at edge of cell, poor channel quality requiring transmissions at peak power for extended periods of time). Further, the arbitrator may consider whether the UE is conserving battery, whether the UE has a fully or nearly fully charged battery, and/or whether the battery is currently being charged. Additionally, the arbitrator may consider phone orientation. This may be useful in detection of antenna performance degradation due to hand grip. Further, the arbitrator may consider system measurements, such as time from last active session, radio resource control (RRC) connected versus idle time, WLAN radio active/inactive, and other metrics such as filtered reference signal strength indication (RSSI), SNR, and reference signal received power (RSRP) per antenna.

In some embodiments, the arbitrator may be unable to determine which antenna to use based on the performance of the antennas. For example, there may not be enough data for either the cellular or WLAN radio to determine performance of the antennas. Thus, the arbitrator may transmit on one antenna of the WLAN radio and one antenna of the cellular radio. The antennas may be spaced such that the antenna chosen for WLAN communication is the antenna furthest from the antenna chosen for cellular communication. In this manner, the arbitrator may probe the antennas to determine the most reliable transmission/receive chain for each of the radios.

FIG. 7—Method for Selecting Antennas

FIG. 7 illustrates a method for a user equipment device (UE) to select an antenna for communications according to a first RAT based at least in part on performance information of another antenna communicating according to a second RAT, according to some embodiments. The method shown in FIG. 7 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 710, first performance information from antennas of a first plurality of antennas coupled to a first radio of the UE may be collected. The first radio may be configured to perform wireless communication according to the first RAT. In some embodiments the first RAT may be a cellular RAT such as GSM, LTE, or LTE-Advanced. Thus the first radio may be a cellular radio. In some embodiments, the first RAT may be a short range wireless RAT such as Wi-Fi. Thus, the first radio may be a Wi-Fi radio.

Further, the first radio may include one or more baseband processors such as baseband processors 502 and 512 described above. Additionally, the radio may include, or may be coupled to, one or more receive chains and at least one transmit chain, such as transmit/receive chains 504, 506, 514, and 516 described above. In addition, a switch (or switch matrix) may be coupled between the transmit/receive chains and the plurality of antennas and may be configured to route a signal received at one of the plurality of antenna to any one of the transmit/receive chains. Similarly, the switch may route signals generated by the baseband processor and transmitted through the at least one transmit chain to any one of the antennas.

In some embodiments, the UE may send the first performance information to one or more processors of the UE (e.g., application processors). Additionally, the UE may collect system information, such as UE battery level, UE battery charge state, radio resource control (RRC) connected-idle ratio for some or all radios of the UE, and active-inactive ratio for some or all radios of the UE. Thus, determining the highest performing antenna may be further based on the system information.

At 720, a highest performing antenna of the first plurality of antennas may be determined based on at least the first performance information and the highest performing antenna may be used for communications according to the first RAT. Performance information may include, for some or all antennas of the UE, any of received signal strength, received signal strength indicator (RSSI), received signal to noise ratio (SNR), packet error rate, antenna gain, filtered RSSI, filtered received SNR, and filtered reference signal strength received power (RSRP). Note that other performance metrics measurable by the UE, or components of the UE are also envisioned.

The term "highest performing antenna" is a relative term and is intended to denote differences in performance between multiple antennas. For example, if antenna A (e.g., antenna 335) has a higher RSSI than antenna B (e.g., antenna 336), then the UE may determine that antenna A has better performance than antenna B. Hence, the UE may choose to use antenna A for transmissions because the signal quality, at least based on RSSI, is higher than antenna B, therefore, the transmission is more likely to be successful. In other words, the UE may determine that antenna A is the "highest performing antenna" out of the group of antennas including A and B and select antenna A for communications.

At 730, a first antenna of a second plurality of antennas may be determined based on at least the first performance information. The second plurality of antennas may be coupled to a second radio of the UE and the second radio may be configured for communications according to a second RAT. Thus, the first antenna may be used for communications according to the second RAT.

In some embodiments, the UE may collect second performance information from antennas of the second plurality of antennas. In such embodiments, the highest performing antenna may be further based on the second performance information. For example, the second performance information may be used when the first performance information is determined to be unreliable. This may be due to a lack of data from the first plurality of antenna. Thus, in order to determine the highest performing antenna, the UE may collect further data, including second performance information. Additionally, in some embodiments, the UE may also collect system performance information and the highest performing antenna may be based on the first and second performance information and the system performance information.

In some embodiments, the first antenna may be proximal to the highest performing antenna. In other words, the first antenna may be closer to the highest performing antenna than other antennas included in the plurality of second antennas. Thus, the term "proximal to" is intended to denote relative differences in position of multiple antennas as compared to a reference antenna (e.g., the highest performing antenna). For example, if the UE determines that antenna A is the highest performing antenna, the UE may then determine the antenna associated with the second radio that is closest in proximity (e.g., proximal to) antenna A. Thus, the UE may determine that antenna C is closer to antenna A as compared to antenna D. In other words, the distance from antenna A to antenna C is less than the distance from antenna A to antenna D.

In some embodiments, the first antenna may be an antenna furthest from the highest performing antenna. For example, if the UE is communicating on the highest performing antenna according to the first RAT and selecting an antenna proximal to the highest performing antenna for communications according to the second RAT would cause the specific absorption rate (SAR) to exceed a first threshold, the UE may determine that the antenna furthest from the highest performing antenna be use for communications according to the second RAT to limit the SAR at the location of the highest performing antenna.

For example, if two radios (e.g., a cellular radio and a Wi-Fi radio) are transmitting with antennas in close proximity, one or both radios may have to reduce transmission power to satisfy SAR compliance requirements (i.e., not exceed the first threshold). However, reducing transmission power may negatively impact transmission performance. Thus, the UE may select a different antenna for one of the radios such that the reduction of transmission power is less. In such instances, the UE may override its initial determination of the highest performing antenna.

As noted above, in some embodiments, a first switch may be coupled between the first plurality of antennas and the first radio and a second switch may be coupled between the second plurality of antennas and the second radio. Additionally, a first state of the first switch may correspond to communications via the highest performing antenna. Additionally, a second state of the second switch may correspond to communications via the first antenna. Thus, in some embodiments, the UE may switch the first switch to the first state in response to determining the highest performing antenna and may also switch the second switch to the second state. In some embodiments, the first and second switch may be in a master/slave configuration. Thus, when the first switch is switched to the first state, the second switch may be automatically switched to the second state.

In further embodiments, in addition to changing the state of a switch, the UE may be configured to save power by disabling (e.g., turning off) a receive chain associated with a lesser performing antenna. Thus, for example, if the UE determines that the highest performing antenna is associated with a first receive chain and the first radio includes an additional receive chain coupled to the lower performing antenna, the UE may disable the additional receive chain to conserve power. Additionally, with regards to the second radio, the UE may similarly disable receive chains coupled to antennas not currently being used for communications. In some embodiments, based on one or more of the previously described environmental factors, power factors, and battery charge information, the arbitrator may determine whether to disable a receive chain associated with a lesser performing antenna. Alternatively or in addition, the arbitrator may also select between at least two algorithms, where a first of the two algorithms is more likely to disable a receive chain associated with a lesser performing antenna than a second of the two algorithms.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement a method, e.g., any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A user equipment device (UE), comprising:
a first plurality of antennas;
a first radio, wherein the first radio is coupled to the first plurality of antennas and configured to perform wireless communication according to a first radio access technology (RAT);
a first switch coupled between the first plurality of antennas and the first radio, wherein the first switch comprises a first plurality of states;
a second plurality of antennas;
a second radio, wherein the second radio is coupled to the second plurality of antennas and configured to perform wireless communication according to a second RAT;
a second switch coupled between the second plurality of antennas and the second radio, wherein the second switch comprises a second plurality of states; and
one or more processors coupled to the first and second radios;
wherein the one or more processors and the first and second radios are configured to perform voice and/or data communications; and
wherein the UE is configured to:
collect first performance information from antennas of the first plurality of antennas;

determine, based on at least the first performance information, a highest performing antenna of the first plurality of antennas to use for communications according to the first RAT, wherein a first state of the first plurality of states corresponds to the highest performing antenna;

determine, based on at least the first performance information, a first antenna of the second plurality of antennas to use for communications according to the second RAT, wherein a second state of the second plurality of states corresponds to the first antenna; and switch the first switch to the first state based on said determining the highest performing antenna, wherein the second switch is configured to automatically switch to the second state based on the first switch switching to the first state.

2. The UE of claim 1,
wherein the highest performing antenna is proximal to the first antenna.

3. The UE of claim 1,
wherein the first radio comprises a cellular radio and wherein the first RAT is LTE.

4. The UE of claim 1,
wherein the first radio comprises a Wi-Fi radio and wherein the first RAT is Wi-Fi.

5. The UE of claim 1,
wherein to collect first performance information, the UE is further configured to:
  send the first performance information from the first radio to the one or more processors; and
  collect system performance information; and
  wherein said determining the highest performing antenna is further based on the system performance information.

6. The UE of claim 1,
wherein the UE is further configured to:
  collect second performance information from antennas of the second plurality of antennas; and
  wherein said determining the highest performing antenna is further based on the second performance information.

7. An apparatus, comprising:
a memory; and
a processing element in communication with the memory, wherein the processing element is configured to:
  receive first performance information from a first baseband processor configured to operate according to a first radio access technology (RAT), wherein the first performance information comprises performance information from antennas of a first plurality of antennas;
  receive second performance information from a second baseband processor configured to operate according to a second RAT, wherein the second performance information comprises performance information from antennas of a second plurality of antennas;
  determine, based on at least the first and second performance information, a highest performing antenna from the first and second plurality of antennas; and
  in response to determining that the highest performing antenna is among the first plurality of antennas:
    select the highest performing antenna for communication according to the first RAT, wherein to select the highest performing antenna, the processing element is further configured to change a state of a first switch coupled between the first plurality of antennas and the first baseband processor; and
    select an antenna among the second plurality of antennas proximal the highest performing antenna for communication according to the second RAT, wherein to select the antenna, a state of a second switch coupled between the second plurality of antennas and the second baseband processor is automatically switched based on the change of state of the first switch.

8. The apparatus of claim 7,
wherein the processing element is further configured to:
  in response to determining that the highest performing antenna is among the second plurality of antennas:
    select the highest performing antenna for communication according to the second RAT; and
    select an antenna among the first plurality of antennas proximal the highest performing antenna for communication according to the first RAT.

9. The apparatus of claim 7,
wherein the first RAT is Wi-Fi, wherein the second RAT is LTE.

10. The apparatus of claim 7,
wherein the processing element is further configured to collect system information, wherein to determine the highest performing antenna the processing element is further configured to determine the highest performing antenna based on at least the first and second performance information and the system information.

11. The apparatus of claim 10,
wherein the system information comprises at least one of device orientation, battery level, or battery charging state.

12. A non-transitory computer readable memory medium storing program instructions executable by one or more processors of a user equipment device (UE) to:
  receive, from a first radio of the UE, first performance information from antennas of a first plurality of antennas coupled to the first radio, wherein the first radio is configured to perform wireless communication according to a first radio access technology (RAT);
  notify the first radio of a highest performing antenna of the first plurality of antennas to use for communications according to the first RAT, wherein the highest performing antenna is determined based at least in part on the first performance information;
  switch a first switch to a first state to couple the first radio to the highest performing antenna, wherein the first switch is coupled between the first plurality of antennas and the first radio, wherein the first switch comprises a first plurality of states, and wherein the first state corresponds to the highest performing antenna;
  notify a second radio of the UE of a first antenna of a second plurality of antennas to use for communications according to a second RAT, wherein the second plurality of antennas are coupled to the second radio of the UE, wherein the second radio is configured to perform wireless communication according to the second RAT, and wherein the first antenna is determined based at least in part on the first performance information; and
  wherein a second switch is configured to automatically switch to a second state based on the first switch switching to the first state, wherein the second switch is coupled between the second plurality of antennas and the second radio, wherein the second switch comprises a second plurality of states, wherein the second state corresponds to the first antenna.

13. The non-transitory computer readable memory medium of claim 12,
  wherein the instructions are further executable by the one or more processors of the UE to:
    determine the first antenna based at least in part on proximity of the first antenna to the highest performing antenna, wherein the first antenna is proximal to the highest performing antenna.

14. The non-transitory computer readable memory medium of claim 12,
  wherein the instructions are further executable by the one or more processors of the UE to collect system performance information comprising one or more of UE battery level, UE battery charge state, radio resource control (RRC) connected-idle ratio, first radio active-inactive ratio, and second radio active-inactive ratio; and
  wherein the highest performing antenna is further determined based on the system performance information.

15. The UE of claim 5,
  wherein the system performance information comprises one or more of UE battery level, UE battery charge state, radio resource control (RRC) connected-idle ratio, first radio active-inactive ratio, and second radio active-inactive ratio.

16. The apparatus of 12,
  wherein the system performance information comprises one or more of battery level, battery charge state, radio resource control (RRC) connected-idle ratio, first radio active-inactive ratio, and second radio active-inactive ratio.

17. The non-transitory computer readable memory medium of claim 12,
  wherein the instructions are further executable by the one or more processors of the UE to:
    collect second performance information from antennas of the second plurality of antennas; and
  wherein said determining the highest performing antenna is further based on the second performance information.

18. The UE of claim 1,
  wherein the first RAT is Wi-Fi, wherein the second RAT is LTE.

19. The non-transitory computer readable memory medium of claim 12,
  wherein the first RAT is Wi-Fi, wherein the second RAT is LTE.

20. The apparatus of claim 7,
  wherein the first RAT is LTE, wherein the second RAT is Wi-Fi.

* * * * *